Patented Mar. 29, 1938

2,112,724

UNITED STATES PATENT OFFICE 2,112,724

METHOD OF PREPARATION OF ANTHRA-QUINONYLGUANIDINES AND SUBSTITUTED ANTHRAQUINONYLGUANIDINES

Martin Battegay, Mulhouse, France, assignor to Calco Chemical Company, Inc., Bound Brook, N. J., a corporation of Delaware No Drawing. Application July 28, 1932, Serial No. 625,534. In France August 3, 1931

7 Claims. (Cl. 260—32)

The preparation of arylguanidines by the action of cyanamide on arylamines has been carried out in the first place by A. Kämpf (D. Chem. Ges., vol. 37 (1904) pg. 1681), who works in an alcoholic medium using the amine in the form of a salt. This same author specifies that the slightly basic amines whose salts dissociate in an alcoholic medium do not react in these circumstances. Fr. Arndt (D. Chem. Ges., vol. 46 (1913) pg. 3522) succeeded in giving to certain of these slightly basic amines, the suitable reaction, by fusing them with an excess of cyanamide (adding by way of solvent for the two, a little alcohol) and by treating, later, with an excess of concentrated hydrochloric acid. Fr. Arndt and B. Rosenau (D. Chem. Ges., vol. 50 (1917) pg. 1251) confirmed later that even a slightly basic amine, provided it is, in general, still salifiable, is susceptible to being changed by the action of cyanamide to the corresponding guanidine, under the condition of dissolving somewhat in the fused cyanamide or in an indifferent diluent, which dissolves the latter as well. They show, on one hand, as examples the producing of three nitrophenylguanidines, of B-naphthylguanidine, and of alpha, alpha-diphenylguanidine, and on the other hand, the impossibility of changing, under these conditions, alpha-aminoanthraquinone and o-nitrodiphenylamine.

The present invention is for the preparation of arylguanidines by the action of cyanamide on arylamines, such as aminoanthraquinones, which does not use either one or the other of the mentioned methods of preparation. It also allows the preparation of products of intramolecular cyclization which certain of these arylguanidines undergo, for example, alpha-anthraquinonylguanidine leading, after the loss of one molecule of water, to amino-C-1.9-pyrimidino-anthrone.

The new process is characterized by the use of an indifferent and strictly anhydrous medium, in which, not the free cyanamide, but its crystallized dihydrochloride ($CN_2H_2.2HCl$) is used. This hydrochloride differs from the free cyanamide in that it can be warmed without trouble to suitably high temperatures (70–150° C.) which are required, for the transformation of the amine or its hydrochloride, by submitting, eventually, during the reaction, the mixture of the products taking part in the action to a current of dry hydrogen chloride gas. The indifferent medium which can be composed of nitrobenzene, anisol, naphthalene, toluene, benzene, etc. includes likewise the phenols, although these can take part, without doubt intermediately, in the reaction, forming arylethers of pseudourea. The cyanamide dihydrochloride can be replaced by substitution products of cyanamide, such as, for example, phenylcyanamide, benzoylcyanamide, phenylsulfoncyanamide, which react in the same manner. These substitution products of cyanamide are stable at the elevated temperature and in the presence of the anhydrous acid required for the transformation of the amine.

The arylguanidines and their substitution products produced by this new method, should be useful as coloring matters or intermediates for their preparation.

Example 1

4.5 parts of alpha-aminoanthraquinone are dissolved in 25 parts of nitrobenzene, then saturated with dry hydrogen chloride gas and treated with 3 parts of cyanamide dihydrochloride. The mixture thus obtained is heated, with brisk stirring, the introduction of a moderate current of dry hydrogen chloride gas being continued, from the first, for an hour to 80° C. The temperature is then gradually raised and finally raised, at the end of two hours, to 150° C. The deep brown reaction product is left until completely cooled. It is free from unchanged cyanamide and contains the transformation product of alpha-aminoanthraquinone, in the form of the hydrochloride, either of alpha-anthraquinonylguanidine or of its cyclization product, amino-C-1.9-pyrimidino-anthrone. After removing the nitrobenzene by steam distillation, the acidity of the residue of the distillation is controlled by eventually adding again dilute hydrochloric acid (N/4). The unchanged aminoanthraquinone remains insoluble under these conditions and is separated by filtration. It is enough, at present, to concentrate the filtrate to provoke crystallization of the hydrochloride mentioned above. This can be purified by recrystallization in acid water, and is made up of intense yellow plates which melt at 275–280° C.

Note:

These plates constitute, without doubt, amino-C-1.9-pyrimidinoanthrone hydrochloride which crystallizes with 3 mol. of water. They are, in fact, identical with the crystals resulting from salification carried out, in the cold, with dilute hydrochloric acid on free amino-C-1.9-pyrimidinoanthrone, and which give the following analyses:

Water analysis:—Sample=0.2652 g. dried at 120°, gives 0.0430 g. water, or 16.22% $H_2O$.

Nitrogen analysis:—Sample=8.219 mg.; V= 0.886 cc. $N_2$; T=21°; P=747 mm., or 12.30% N.

Chlorine analysis:—Sample=0.1835 g.; 0.0789 g. AgCl or 10.64% Cl; calculated for $$C_{15}H_{10}ON_3Cl.3H_2O=16.02\% \ H_2O;$$

12.46% N; 10.52% Cl.

Nitrogen analysis of material dried at 120°= Sample=8.683 mg.; V=1.156 cc. $N_2$; T=22°; P= 738 mm., or 14.96% N; calculated for $C_{15}H_{10}ON_3Cl$ =14.84% N.

The following two tautomeric formulae may be ascribed to the hydrochloride:

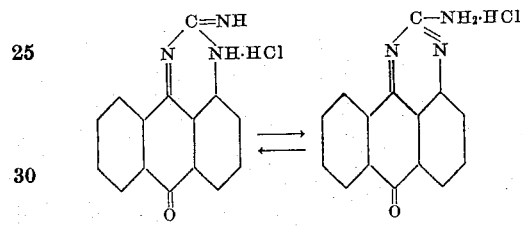

In treating a dilute aqueous solution of this hydrochloride, at 60° C., with ammonia, the base is precipitated in the form of red-brown flakes, which, when dried, dissolve easily in nitrobenzene, from which it can be recrystallized. It then forms needles of the same color and melts between 290–295° C. The following two tautomeric formulae may be ascribed to the free base:

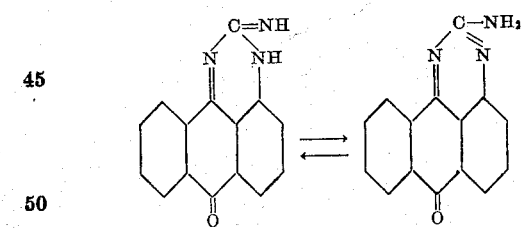

The nitrogen determination corresponds to cyclization product of alpha-anthraquinonyl-guanidine which corresponds, following the loss of a molecule of water, to amino-C-1.9-pyrimidinoanthrone, the benzoyl derivative of which confirms the composition. This last recrystallized from toluene begins to decompose at 135° C., and only completely melts between 205 and 209° C.

Nitrogen determination of amino-C-1.9-pyrimidinoanthrone:—Sample=8.170 mg.; V=1.263 cc. $N_2$; T=19°; P=745 mm., or 16.9% N.; calculated for $C_{15}H_9ON_3$=17.0% N.

Nitrogen determination of benzoylamino-C-1.9-pyrimidino-anthrone:—Sample=7.517 mg.; V=0.802 cc. $N_2$; T=20°; P=743 mm., or 12.15% N.; calculated for $C_{22}H_{13}O_2N$=11.91% N.

In addition to the pyrimidinoanthrone compound described above, some of the alpha-anthraquinonylguanidine is present. This compound is undoubtedly first formed and then transformed into the cyclization product, namely the pyrimidinoanthrone.

*Example 2*

One works as in Example 1, substituting for the alpha-amino-anthraquinone the same amount of its beta isomer. The nitrobenzene can be replaced also by the same amount of anisol, naphthalene, or of metacresol. The beta-anthraquinonylguanidine hydrochloride consists of a canary yellow crystalline powder which melts and decomposes at 285–290° C. It is readily soluble in hot water, difficultly so in cold and crystallizes with one molecule of water.

The hydrochloride has most likely the following formula:

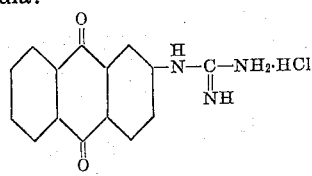

Nitrogen determination:—Sample=8.810 mg.; V=1.015 cc. $N_2$; T=18°; P=732 mm., or 13.0% N; calculated for $C_{15}H_{12}O_2Cl+H_2O$=13.1% N.

Water determination:—Sample=0.5317 g. losing at 110° 0.0263, or 4.9% $H_2O$; calculated for $C_{15}H_{12}O_2N_3Cl+H_2O$=5.4% $H_2O$.

Chlorine determination:—Sample dried at 110°=0.296 g.; AgCl=0.1396 g. or 11.65% Cl; calculated for $C_{15}H_{12}O_2N_3Cl$.

The free base of beta-anthraquinonylguanidine recrystallized in aqueous pyridine, consists of an orange-yellow crystalline powder which turns brown and decomposes at 244–246° C. Its benzoyl derivative likewise recrystallized from aqueous pyridine is clear yellow and melts at 274° C. It contains two benzoyl groups. The structural formula thereof is most probably as follows:

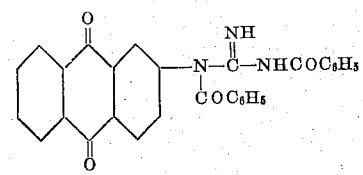

Nitrogen determination of the base:—Sample= 4.256 mg.; V=0.587 cc. $N_2$; T=15°; P=741 mm.; or 15.9% N.; calculated for $C_{15}H_{11}O_2N_3$=15.8% N.

Nitrogen determination of the benzoyl derivative:—Sample=7.329 mg.; V=0.587 cc. $N_2$; T= 19°; P=747 mm.; or 9.2% N; calculated for $C_{29}H_{19}O_4N_3$=8.9% N.

*Example 3*

5.4 parts of 1.4-aminonitroanthraquinone are dissolved in 60 parts of metacresol, then saturated with dry hydrogen chloride gas and treated with three parts of cyanamide dihydrochloride. The mixture thus obtained is heated, with brisk stirring and a continuous moderate stream of dry hydrogen chloride gas, for two hours at 100–110° C., then the temperature is gradually raised for two additional hours to 150° C. The brown reaction product is left until completely cold, then rid of the metacresol by steam distillation. The residue of this distillation finally acidulated with dilute hydrochloric acid, is filtered from a brown, resinous insoluble product containing, among other things, the unchanged aminonitroanthraquinone. In rendering the filtrate ammoniacal, a red flocculent product precipitates which, when dried, is readily soluble in warm nitrobenzene, to separate in the cold in the form of a red-brown powder. Purified by this method, this powder decomposes and darkens at 283° C. It corresponds by its properties and the amount of nitrogen, to an amino-C-9.1-pyrimidino-4-nitroanthrone.

Nitrogen determination:—Sample=5.821 mg.; V=0.972 cc. $N_2$; T=20°; P=750 mm.; or 19.22% N; calculated for $C_{15}H_8O_3N_4$=19.18% N.

The following two tautomeric formulae may be ascribed to the free base:

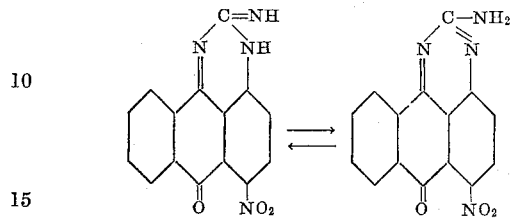

Example 4

4.5 parts of alpha-amino-anthraquinone are dissolved in 25 parts of nitrobenzene or toluene, then saturated with dry hydrogen chloride gas and then, without continuing the introduction of hydrogen chloride, and treated with 3.15 parts benzoylcyanamide. The mixture thus obtained is heated, with brisk stirring, first for an hour at 80° C., then for three to four hours at 100° C.

The red-brown reaction product is freed from the solvent by steam-distillation, then treated in the cold with dilute hydrochloric acid to dissolve and separate by filtration the amino-C-1.9-pyrimidinoanthrone hydrochloride, which, moreover, only forms in small amounts by limiting the length of the reaction to the time indicated. Ammonia is added to the filtrate to precipitate the free base, which is filtered and dried. The chief product of the reaction is insoluble in hydrochloric acid and consists of benzoylamino-C-1.9-pyrimidinoanthrone that can be purified by recrystallization in toluene.

The following two tautomeric formulae may be ascribed to the compound:

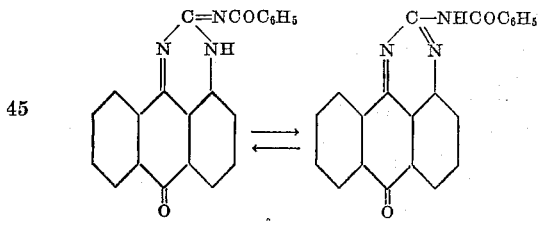

What I claim is:

1. A method which comprises treating a beta amino anthraquinone in an inert anhydrous medium in the presence of dry HCl with a cyanamide dihydrohalogenide to form an anthraquinonyl substituted guanidine.

2. A method which comprises treating a beta amino anthraquinone in an inert anhydrous medium in the presence of dry HCl with a cyanamide dihydrochloride to form an anthraquinonyl substituted guanidine.

3. A method which comprises treating an alpha-amino anthraquinone in an inert anhydrous medium in the presence of dry HCl with a cyanamide dihydrohalogenide.

4. A method which comprises treating an alpha-amino anthraquinone in an inert anhydrous medium in the presence of dry HCl with a cyanamide dihydrochloride.

5. A method which comprises treating a beta amino anthraquinone in an inert anhydrous medium with a cyanamide dihydrohalogenide to form an anthraquinonyl substituted guanidine in the presence of a dry halogen hydride.

6. As new products amino-C-1.9 pyrimidinoanthrones.

7. The anthrapyrimidine corresponding to the formula

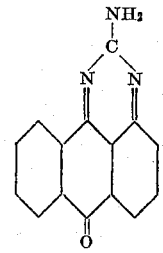

giving a brown vat, crystallizing in orange needles which dissolve in concentrated sulfuric acid giving a yellow coloration.

MARTIN BATTEGAY.